US011678962B2

(12) United States Patent
Reingold

(10) Patent No.: US 11,678,962 B2
(45) Date of Patent: Jun. 20, 2023

(54) LIP RETRACTOR AND SUCTION HEAD FOR HIGH-VOLUME EVACUATOR

(71) Applicant: Andrew Reingold, DMD PC, New York, NY (US)

(72) Inventor: Andrew Reingold, New York, NY (US)

(73) Assignee: Andrew Reingold, New York, NY (US)

( * ) Notice: Subject to any disclaimer, the term of this patent is extended or adjusted under 35 U.S.C. 154(b) by 57 days.

(21) Appl. No.: 17/316,181

(22) Filed: May 10, 2021

(65) Prior Publication Data

US 2021/0346134 A1  Nov. 11, 2021

Related U.S. Application Data

(60) Provisional application No. 63/028,898, filed on May 22, 2020, provisional application No. 63/023,117, filed on May 11, 2020.

(51) Int. Cl.
*A61C 17/10* (2006.01)
*A61C 17/12* (2006.01)
*A61C 17/08* (2006.01)

(52) U.S. Cl.
CPC ............. *A61C 17/10* (2019.05); *A61C 17/08* (2019.05); *A61C 17/12* (2019.05); *A61C 2201/00* (2013.01)

(58) Field of Classification Search
CPC .... A61C 5/90; A61C 7/08; A61C 7/10; A61C 7/12; A61C 7/06; A61C 7/092; A61C 7/096; A61C 19/00; A61B 1/24; A61B 90/40; A61M 1/84
See application file for complete search history.

(56) References Cited

U.S. PATENT DOCUMENTS

| 744,204 | A | 11/1903 | Jordan | |
|---|---|---|---|---|
| 3,027,643 | A * | 4/1962 | Cohen | A61C 17/08 433/93 |
| 2004/0185415 | A1 | 9/2004 | Ghim | |
| 2007/0148619 | A1 | 6/2007 | Anderson | |
| 2008/0064001 | A1* | 3/2008 | Dorfman | A61C 5/90 433/140 |
| 2011/0311942 | A1 | 12/2011 | Black et al. | |
| 2014/0023987 | A1* | 1/2014 | Cardon | A61C 17/08 433/95 |
| 2019/0365214 | A1* | 12/2019 | Lloro Boada | A61B 1/0684 |
| 2022/0202546 | A1* | 6/2022 | Tevrizian | A61C 17/08 |

OTHER PUBLICATIONS

International Search Report for related PCT Application No. PCT/US2021/031673 dated Sep. 2, 2021, 3 pages.

* cited by examiner

*Primary Examiner* — Nicholas D Lucchesi
(74) *Attorney, Agent, or Firm* — Tutunjian & Bitetto, P.C.

(57) ABSTRACT

A system for lip retraction and aerosol reduction, including a mouthpiece with an integrated single-lip retractor and aerosol suction head, single-lip internal retentive wings and external retentive wings configured to support and secure the mouthpiece in a mouth of a patient, and comfort retention notches formed between the internal retentive wings and external retentive wings to enhance comfort of the patient and to secure the mouthpiece in the mouth of the patient. The system includes a High-Volume Evacuator (HVE) valve stem configured for attachment to an HVE suction tube to provide suction for the aerosol reduction.

20 Claims, 9 Drawing Sheets

LIP RETRACTOR AND SUCTION HEAD FOR HIGH-VOLUME EVACUATOR

BACKGROUND

Technical Field

The present invention generally relates to dental lip retractors and suction heads for High-Volume Evacuator (HVE) systems, and more particularly to a single-piece, extraoral, aerosol suction device head with an integrated lip retractor mouthpiece configured for hands-free use when connected to the mouth of a patient that is compatible for toolless attachment to all HVE and high-speed suction systems.

Description of the Related Art

Illnesses are commonly shared in the workplace, but the risk of exposure is significantly higher for hygienists and dentists using powered instrumentation such as, for example, any sort of dental handpieces, ultrasonics, and air polishers during dental procedures. Bacteria and viruses can spread rapidly through splatter and aerosols produced by these types of treatments. Powered instrumentation technologies are widely used in many dental procedures, and High-Volume Evacuators (HVEs), which are suction devices which draw a large volume of air and fluids over a period of time, are currently utilized as safety protection from contaminated aerosols.

Research has shown that aerosols and splatter produced by ultrasonic and air polishing treatments contain saliva, blood, bacteria, and pathogens. Once airborne, aerosol particles can linger in the operatory for an hour or more while splatter lands on the surfaces immediately surrounding the treatment area. This poses a risk for the spread of the common cold and influenza viruses, herpes viruses, pathogenic streptococci or staphylococci, severe acute respiratory syndrome (SARS), tuberculosis (TB), and COVID-19.

Conventional devices for limiting the escape of aerosols during dental procedures are attached to the patient by separate or connected full-mouth lip/cheek retractors, that open the patient's mouth widely by separating both lips of the patient, and the completely open-mouth functionality of such conventional devices allows a significant amount of aerosol to still escape from the mouth of the patient when attached to an HVE system. Conventional lip retractors include deficiencies such as being challenging for patients to be comfortable because of the supposed one-size fits all spring which separates both lips and cheeks, in particular if a patient's top and bottom teeth are separated for dental work, as they are intended for just dental photography.

Many such devices also require adjustment of standard high-speed suction tips to fit into a conventional HVE system, require additional complex locking mechanisms that add costs and are less reliable, or do not attach to the patient at all, and thus-must be realigned each time a patient is repositioned and become ineffective as they must be positioned at a relative far distance from the patients mouth to enable sufficient lines of sight for dental providers on their operating field in the mouth of a patient.

The current COVID-19 pandemic has raised heightened concerns regarding dentistry's ability to limit exposure to created aerosol from the patient that might contain virus and bacteria that are harmful during dental procedures. Thus, there is a need for an easily usable hands-free device which is comfortable for a patient, and which effectively lowers the risk of the spread of such aerosols during dental procedures to ensure the continued delivery of dental care while minimizing any exposure by dental professionals to such virus and bacteria.

SUMMARY

In accordance with an aspect of the present invention, a system for lip retraction and aerosol reduction is provided. The system includes a mouthpiece with an integrated single-lip retractor and aerosol suction head, single-lip internal retentive wings and external retentive wings configured to support and secure the mouthpiece in a mouth of a patient, and comfort retention notches formed between the internal retentive wings and external retentive wings to enhance comfort of the patient and to secure the mouthpiece in the mouth of the patient. The system includes a High-Volume Evacuator (HVE) valve stem configured for attachment to an HVE suction tube to provide suction for the aerosol reduction.

In accordance with an aspect of the present invention, a system for lip retraction and aerosol reduction is provided. The system includes a mouthpiece with an integrated single-lip retractor and aerosol suction head, single-lip internal retentive wings and external retentive wings configured to support and secure the mouthpiece in a mouth of a patient, and comfort retention notches formed between the internal retentive wings and external retentive wings to enhance comfort of the patient and to secure the mouthpiece in the mouth of the patient.

In accordance with an aspect of the present invention, a system for lip retraction and aerosol reduction is provided. The system includes a mouthpiece with an integrated single-lip retractor and aerosol suction head, single-lip internal retentive wings and external retentive wings configured to support and secure the mouthpiece in a mouth of a patient, the internal retentive wings being configured to expose lower teeth of the patient by being inserted into the mouth of the patient by positioning the internal retentive wings between lower gums and the lower teeth of the patient; and comfort retention notches formed between the internal retentive wings and external retentive wings to enhance comfort of the patient and to secure the mouthpiece in the mouth of the patient.

These and other features and advantages will become apparent from the following detailed description of illustrative embodiments thereof, which is to be read in connection with the accompanying drawings. The system includes a High-Volume Evacuator (HVE) valve stem configured for attachment to an HVE suction tube to provide suction for the aerosol reduction.

BRIEF DESCRIPTION OF THE DRAWINGS

The following description will provide details of preferred embodiments with reference to the following figures wherein.

DETAILED DESCRIPTION

Figure 1A:
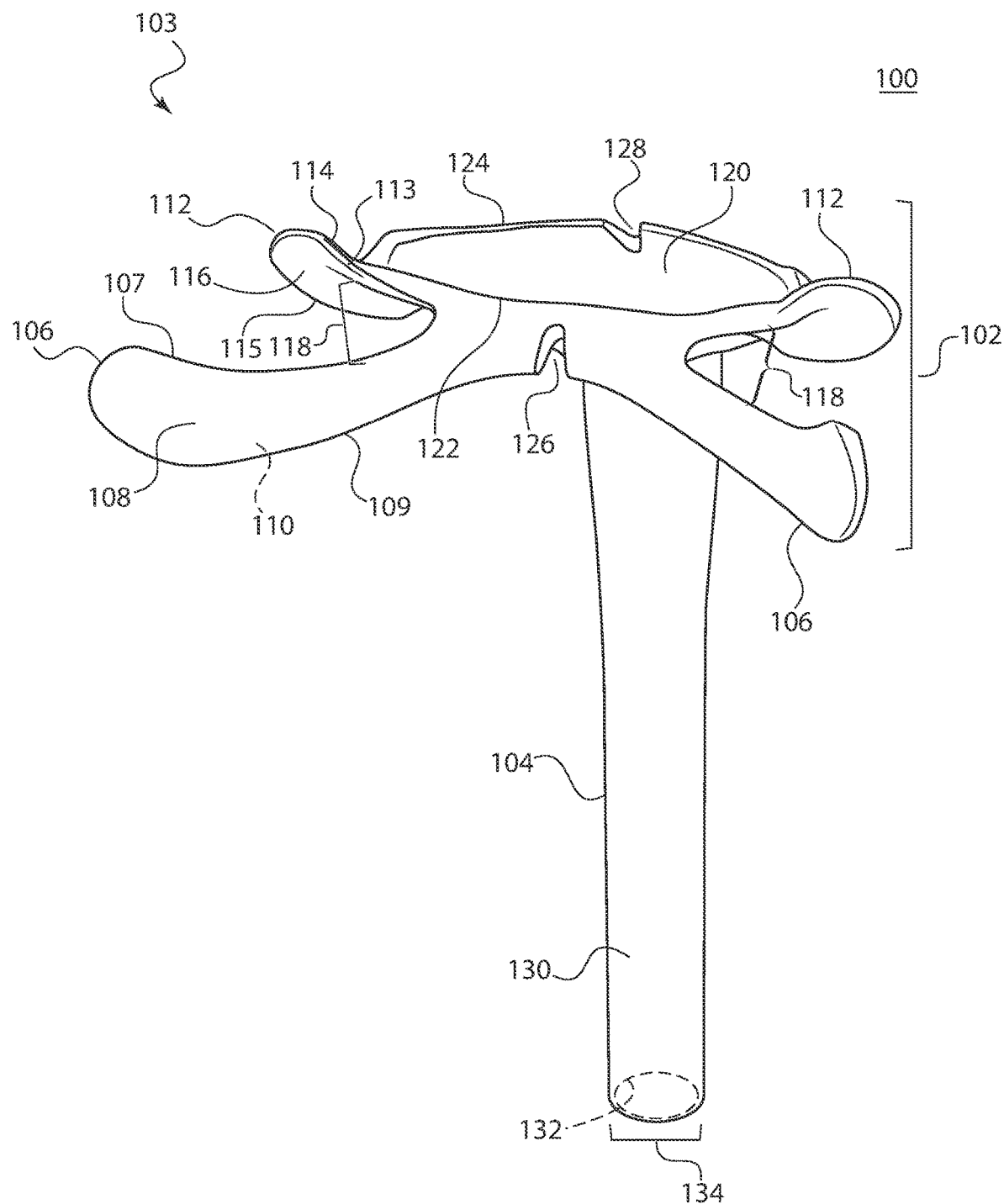
FIG. 1A is a view showing components of a single-piece extraoral, aerosol suction device head with a High-Volume Evacuator (HVE) line/valve stem and an integrated lip retractor mouthpiece configured for hands-free use when positioned in the mouth of a patient, in accordance with an aspect of the present invention.

The present invention generally relates to dental lip retractors and suction heads for High-Volume Evacuator (HVE) systems, and more particularly to an integrated hands-free dental lip retractor mouthpiece and aerosol suction head configured for compatibility and toolless attachment to all HVE and high-speed suction systems.

With the current COVID-19 pandemic bringing into light the concern about dentistry's ability to created aerosol from the patient that might contain virus and bacteria that are harmful, advice to lower and mitigate the risk of the spread of such aerosols is important in the continued delivery of dental care.

Conventional lip retractors and suction devices (disposable or reusable) are attached to the patient by separate lip retractors that open the mouth very widely, thereby decreasing effectiveness of limiting aerosol exposure. With the lip retractor of the present invention, only one lip at a time (e.g., the lower lip or upper lip) is retracted to achieve proper stability and effective placement, without retracting the opposing lip (e.g., upper lip or lower lip) to prevent much more aerosol from escaping further away from the aerosol suction head than conventional systems.

Other conventional devices either require adjustment of standard high-speed suction tips to fit, additional locking mechanisms that add costs and are less reliable, or do not lock at all and thus are not stable. The one-piece design of one embodiment of the present invention firmly locks into pre-existing standard high-speed suction with the wedge lock. In another embodiment, the present invention directly and snugly fits into the stand alone HVE line securely by insertion such that both of the above-mentioned embodiments include a hands-free aerosol eliminator and single-lip retractor in accordance with the present principles.

The present disclosure may be understood more readily by reference to the following detailed description of the disclosure taken in connection with the accompanying drawing figures, which form a part of this disclosure. It is to be understood that this disclosure is not limited to the specific devices, methods, conditions, or parameters described and/or shown herein, and that the terminology used herein is for the purpose of describing particular embodiments by way of example only and is not intended to be limiting of the claimed disclosure. Also, as used in the specification and including the appended claims, the singular forms "a," "an," and "the" include the plural, and reference to a particular numerical value can include at least that particular value, unless the context clearly dictates otherwise. Ranges may be expressed herein as from "about" or "approximately" one particular value and/or to "about" or "approximately" another particular value. When such a range is expressed, another embodiment can include from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure. For example, the references "upper" and "lower" are relative and used only in the context to the other, and are not necessarily "superior" and "inferior".

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C).

This may be extended, as readily apparent by one of ordinary skill in this and related arts, for as many items listed.

Referring now to the drawings, in which like numerals represent the same or similar elements, and initially to FIG. 1A, a view 100 showing components of a single-piece extraoral, aerosol suction device head 103 with a High-Volume Evacuator (HVE) line/valve stem 104 and an integrated mouthpiece 102 configured for hands-free use when positioned in the mouth of a patient, is illustratively depicted in accordance with aspects of the present invention.

Conventional disposable devices are attached to the patient by separate lip retractors that open the mouth much wider and less comfortably than the mouthpiece 102 of the extraoral, aerosol suction device head 103 of the present invention, and thus, the effectiveness of aerosol reduction and comfort for the patient is increased in comparison to conventional systems. In an embodiment of the present invention, the lip retracting functionality of the mouthpiece 102 can retract only a single lip of a patient (lower or upper lip) to, for example, assist in opening the mouth of a patient for visibility for dental photography or other dental procedures, achieve stability and effective placement of the aerosol suction device head 103 without retracting both lips at the same time, and prevent more aerosol from escaping further away from the aerosol suction head than conventional systems at least in part due to the single lip retracting capability of the mouthpiece 102 of the present invention.

In accordance with aspects of the present invention, the single-lip retractor design of the integrated lip retractor and aerosol suction device head 103 provides stability with less tension to a patient's mouth because it prevents over-extending of the upper and lower lips at the same time. Using a conventional upper and lower combined lip and cheek retractor is uncomfortable even for short term use, as it is configured to stay inside a patient's mouth for dental photographs or simple accelerated (quick) whitening visits, in which it is not required for the patient to keep upper and lower teeth separated. When using such conventional devices, the upper and lower teeth are separated, the corners of the lips come inward, (e.g., towards each other), which is in direct opposition to the forces generated but those devices, which further exacerbates the discomfort for the patient during use.

To require a patient to wear such a conventional device for the entirety of all dental procedures results in a large the number of breaks and removing/replacing of the larger retraction devices, which can result in a particular procedure not being completed due to, for example, excessive discomfort for the patient, if they could even get through the procedure due to the discomfort. The mouthpiece 102 of the integrated lip retractor and aerosol suction device head 103 of the present invention prevents such breaks and eliminates the need for removing and/or replacing conventional larger retraction devices in accordance with various embodiments.

In accordance with aspects of the present invention, the configuration of the mouthpiece 102 in which the suction is applied from the lower lip pulls (e.g., vacuums) moisture, aerosol, fluid, etc., away from the dental providers who generally sit behind the patient when performing dental procedures. As the patients are lying back during a dental procedure, air flow is directed towards the patient's feet rather than toward the dental provider (e.g., dentist, hygienist, assistant, etc.), thus further protecting the dental provider from contact with any moisture, aerosol, fluid, etc. while performing dental procedures when using the integrated lip retractor and aerosol suction device head 103 of the present invention.

In accordance with embodiments of the present invention, a single-piece extraoral, integrated lip retractor and aerosol suction device head 103 can include an integrated lip retractor mouthpiece portion 102 and an HVE line/valve stem 104, with the mouthpiece 102 being configured to expose the teeth (upper or lower) of a patient during dental procedures, as described in further detail herein below. The mouthpiece 102 can include internal retentive wings/tabs 106, and the internal retentive wings 106 can include a top edge 107, a bottom edge 109, a front side 108, and a rear side 110 configured to expose the teeth (upper or lower) and comfortably secure the aerosol suction device head 103 in the mouth of a patient using the mouthpiece 102. In some embodiments, the mouthpiece 102 and the HVE line/valve stem 104 can be separable, as described in further detail with reference to FIG. 2A.

The mouthpiece 102 can include external retentive wings/tabs 112, and the external retentive wings 112 can include a top side 114, a bottom side 116, a front edge 113, and a rear edge 115 configured to support and secure the mouthpiece 102 in the mouth of a patient. A comfort retention cutout/notch 118 can form a space between the internal retentive wings 106 and the external retentive wings 112 to enhance comfort and fit of the mouthpiece 102 when inserted into the mouth of a patient. In some embodiments, the wings 106, 112 can be formed from a semi-rigid flexible material such that the internal wings 106 can be shaped to securely and comfortably fit around the teeth of a patient and/or the external wings 112 can be shaped to securely and comfortably support the mouthpiece 102 on the lip of a patient (described in further detail with reference to FIGS. 3A-5), in accordance with aspects of the present invention.

In accordance with aspects of the present invention, the mouthpiece 102 can include a mouthpiece suction opening 120 which can include a mouthpiece opening bottom edge 122 and a mouthpiece opening top edge 124. In some embodiments, the mouthpiece opening top edge 124 can include a safety comfort cutout/vent 128 at or near a midpoint of the mouthpiece opening top edge 124 to prevent lips of a patient from being sucked into the opening 120 and being stuck without a safety comfort cutout/vent 128 to enable comfortable separation of the lips of a patient and the mouthpiece 102. An internal frenum comfort cutout 126 can be formed at or near a midpoint between opposing internal retentive wings 106, and can extend upward from a bottom edge 109 of the internal retentive wings 106 such that the frenum (e.g., labial frenum) of a patient can be positioned within the comfort cutout 126 when the mouthpiece 102 is inserted into the mouth of a patient, in accordance with aspects of the present invention. The HVE line/valve stem 104 of the integrated lip retractor and aerosol suction device head 103 can include external sidewalls 130, internal sidewalls 132, and an HVE line/valve stem connecting end portion 134 configured for connection to a valve handpiece (e.g., HVE valve handpiece), in accordance with embodiments of the present invention.

The components of the integrated lip retractor and aerosol suction device head 103 can be fabricated from any material suitable for dental/health-care devices, including, for example, paper, cardboard, plastics, metals, polymers, ceramics, semi-rigid materials, rigid materials, rubbers, silicone, Styrofoam, etc., as readily understood by one of ordinary skill in the art. In accordance with various embodiments of the present invention, some or all components of the integrated lip retractor and aerosol suction device head 103 and attachable HVE line/tube can be configured to be disposable (e.g., paper, cardboard, Styrofoam, high-density polyethylene (HDPE), 3-dimensional (3D) resins, 3D printed materials, etc.), or configured to be sterilized and non-disposable (e.g., plastic, metal, rubber, etc.). Of course, in accordance with various embodiments, the integrated lip retractor and suction head and attachable HVE line/tube may also include other elements (not shown), and may be formed from any suitable materials, as readily contemplated by one of skill in the art, as well as omit certain elements.

It is to be appreciated that the HVE line/valve stem 104 can be an industry standard HVE line or can be a customized HVE line formed from a flexible, malleable material (e.g., HDPE, other plastics, rubber, 3D resins, 3D printed material, etc.). This flexibility enables the user (e.g., dental professional) to position the HVE line/valve stem 104 by bending and shaping the HVE line 104 to prevent uncomfortable contact with the mouth, face, or body of a patient during use, in accordance with aspects of the present invention.

Figure 1B:
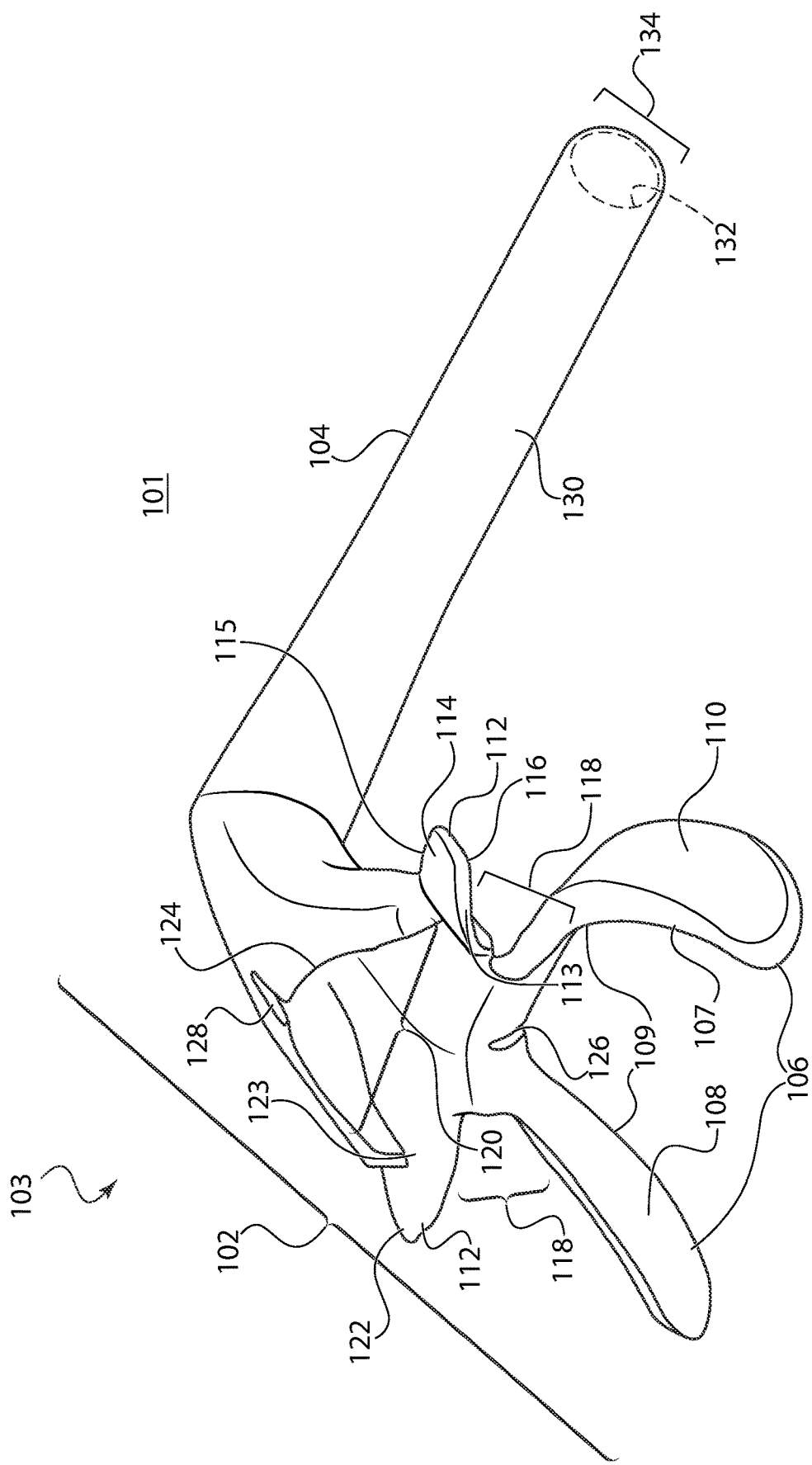
FIG. 1B is a view showing components of a single-piece extraoral, aerosol suction device head with a High-Volume Evacuator (HVE) line/valve stem and an integrated lip retractor mouthpiece configured for hands-free use when positioned in the mouth of a patient, in accordance with an aspect of the present invention.

Referring now to FIG. 1B, a view 101 showing components of a single-piece extraoral, aerosol suction device head 103 with a High-Volume Evacuator (HVE) line/valve stem 104 and an integrated mouthpiece 102 of the system of FIG. 1A, is illustratively depicted in accordance with aspects of the present invention.

In accordance with embodiments of the present invention, a single-piece extraoral, integrated lip retractor and aerosol suction device head 103 can include an integrated lip retractor mouthpiece portion 102 and an HVE line/valve stem 104, with the mouthpiece 102 being configured to expose the teeth (upper or lower) of a patient during dental procedures, as described in further detail herein below. The mouthpiece 102 can include internal retentive wings/tabs 106, and the internal retentive wings 106 can include a top edge 107, a bottom edge 109, a front side 108, and a rear side 110 configured to expose the teeth (upper or lower) and comfortably secure the aerosol suction device head 103 in the mouth of a patient using the mouthpiece 102. In some embodiments, the mouthpiece 102 and the HVE line/valve stem 104 can be separable, as described in further detail with reference to FIG. 2A.

The mouthpiece 102 can include external retentive wings/tabs 112, and the external retentive wings 112 can include a top side 114, a bottom side 116, a front edge 113, and a rear edge 115 configured to support and secure the mouthpiece 102 in the mouth of a patient. A comfort retention cutout/notch 118 can form a space between the internal retentive wings 106 and the external retentive wings 112 to enhance comfort and fit of the mouthpiece 102 when inserted into the mouth of a patient. In some embodiments, the wings 106, 112 can be formed from a semi-rigid flexible material such that the internal wings 106 can be shaped to securely and comfortably fit around the teeth of a patient and/or the external wings 112 can be shaped to securely and comfortably support the mouthpiece 102 on the lip of a patient (described in further detail with reference to FIGS. 3A-5), in accordance with aspects of the present invention.

In accordance with aspects of the present invention, the mouthpiece 102 can include a mouthpiece suction opening 120 which can include a mouthpiece opening bottom edge 122 and a mouthpiece opening top edge 124. In some embodiments, the mouthpiece opening top edge 124 can include a safety comfort cutout/vent 128 at or near a midpoint of the mouthpiece opening top edge 124. An internal frenum comfort cutout 126 can be formed at or near a midpoint between opposing internal retentive wings 106, and can extend upward from a bottom edge 109 of the internal retentive wings 106 such that the frenum (e.g., upper, or lower labial frenum) of a patient can be positioned within the comfort cutout 126 when the mouthpiece 102 is inserted into the mouth of a patient, in accordance with aspects of the present invention. The HVE line/valve stem 104 of the integrated lip retractor and aerosol suction device head 103 can include external sidewalls 130, internal sidewalls 132, and an HVE line/valve stem connecting end portion 134 configured for connection to a valve handpiece (e.g., HVE valve handpiece), in accordance with embodiments of the present invention.

The components of the integrated lip retractor and aerosol suction device head 103 can be fabricated from any material suitable for dental/health-care devices, including, for example, paper, cardboard, plastics, metals, polymers, ceramics, semi-rigid materials, rigid materials, rubbers, silicone, Styrofoam, etc., as readily understood by one of ordinary skill in the art. In accordance with various embodiments of the present invention, some or all components of the integrated lip retractor and aerosol suction device head 103 and attachable HVE line/tube can be configured to be disposable (e.g., paper, cardboard, Styrofoam, high-density polyethylene, etc.), or configured to be sterilized and non-disposable (e.g., plastic, metal, rubber, etc.). Of course, in accordance with various embodiments, the integrated lip retractor and suction head and attachable HVE line/tube may also include other elements (not shown), and may be formed from any suitable materials, as readily contemplated by one of skill in the art, as well as omit certain elements.

Figure 2A:
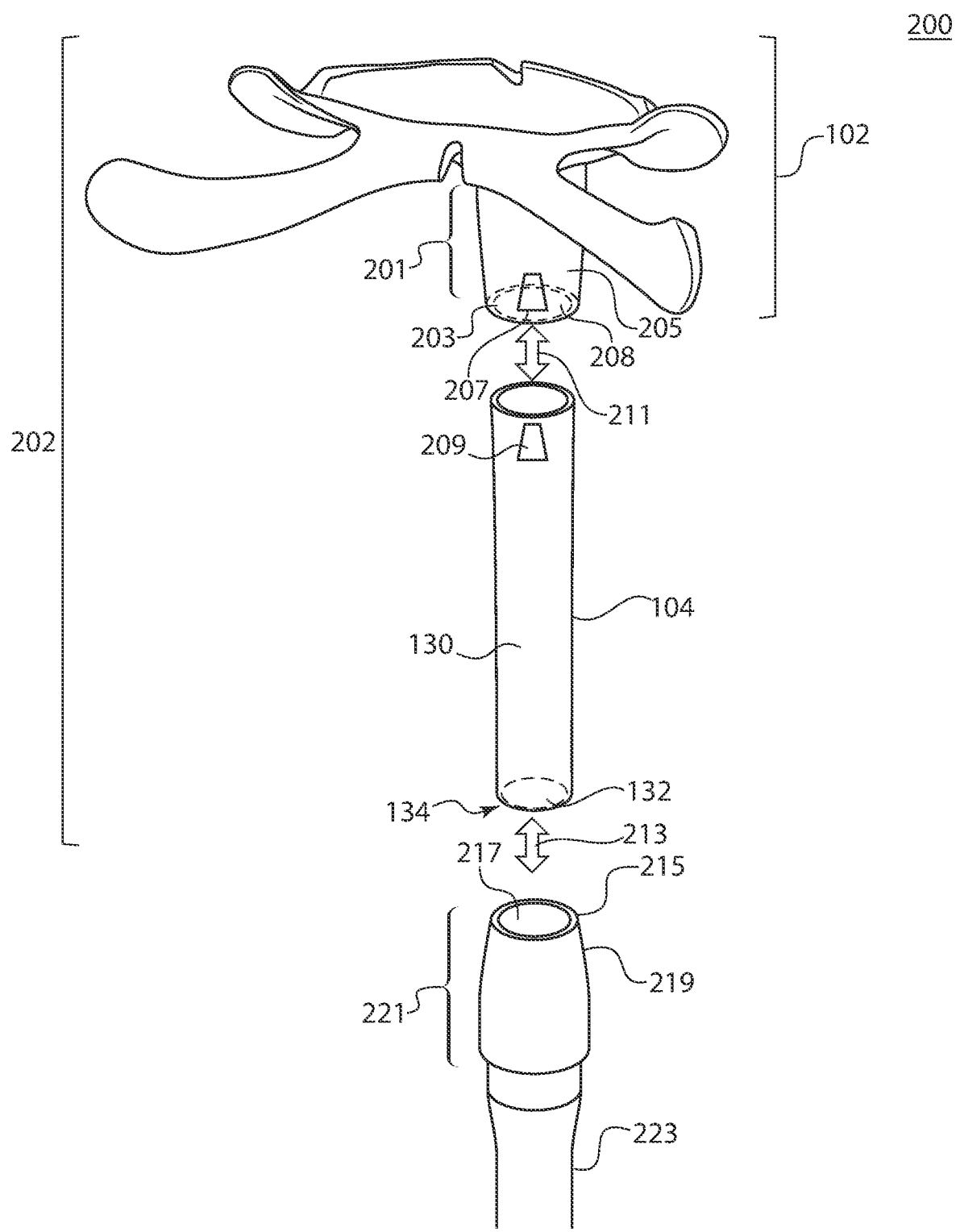
FIG. 2A is a view showing non-assembled components of an extraoral, aerosol suction device head with a separable lip retractor mouthpiece configured for hands-free use when positioned in the mouth of a patient with an attachable High-Volume Evacuator (HVE) valve and HVE line/tube, in accordance with an aspect of the present invention.

Referring now to FIG. 2A, with continued reference to FIG. 1A, a view 200 showing non-assembled components of an extraoral, aerosol suction device head 202 with a High-Volume Evacuator (HVE) line/valve stem 104 and a separable mouthpiece 102 configured for hands-free use when positioned in the mouth of a patient with an attachable High-Volume Evacuator (HVE) valve 221 and HVE line/tube 223, is illustratively depicted in accordance with aspects of the present invention.

In accordance with embodiments of the present invention, an extraoral lip retractor and aerosol suction device head 103 can include a lip retractor mouthpiece portion 102 and a separable HVE line/valve stem 104, with the mouthpiece 102 being configured to expose the teeth (upper or lower) of a patient during dental procedures, as described in further detail herein below. The mouthpiece 102 can include internal retentive wings/tabs 106, and the internal retentive wings 106 can include a top edge 107, a bottom edge 109, a front side 108, and a rear side 110 configured to expose the teeth (upper or lower) and comfortably secure the aerosol suction device head 103 in the mouth of a patient using the mouthpiece 102.

In some embodiments, the mouthpiece 102 and the HVE line/valve stem 104 can be separable, and the mouthpiece 102 can include a mouthpiece-to-HVE line connecting end portion 201, which can include internal sidewalls 203, external sidewalls 205, and a securing mechanism 207 (e.g., wedge lock, clip lock, interference fit, snap fit, etc.) to connect 211 with the HVE line/valve stem 104 by inserting the HVE line/valve stem 104 into the opening 208 in the mouthpiece-to-HVE line connecting end portion 201. The HVE line/valve stem 104 can be inserted into the mouthpiece-to-HVE line connecting end portion 201 such that the external sidewalls 130 of the HVE line/valve stem 104 are in contact with the internal sidewalls 203 of the mouthpiece-to-HVE line connecting end portion 201 and secured using, for example, a lock receiving portion 209, in accordance with aspects of the present invention.

By attaching the mouthpiece 102 to a pre-existing standard high-speed suction line or disposable tip, the present invention can remove aerosol created during dental procedures that are escaping from the patient, as close to the source as possible. The mouthpiece 102 also can simultaneously aid in lip retraction and moisture, fluid, aerosol, etc. control for better visualization and photography by dental providers. Moreover, the disposable design of some embodiments is a less-expensive solution than conventional systems, which can aid in routine dentistry.

In some embodiments, the locking mechanism 203, 209 (e.g., wedge lock, snap fit, interference fit, etc.) can secure the mouthpiece with the HVE line/valve stem 104 by sliding the mouthpiece-to-HVE line connecting end portion 201 over the HVE line/valve stem 104 and locking together using the locking mechanism 203, 209 to prevent dislodging during use. The locking mechanism 203, 209 of the present invention can firmly and securely attach the mouthpiece 102 to any pre-existing, standard high-speed suction tips, extender tubes, HVE line/valve stems 104 (e.g., connection line/tube) to directly insert into a valve handpiece 221 and/or high-speed evacuation line 223. The built-in single-lip retractor mouthpiece 102 can expose the operating field (e.g., teeth) for dental work or dental photography while minimizing aerosol escaping, in accordance with various embodiments of the present invention.

The mouthpiece 102 can include external retentive wings/tabs 112, and the external retentive wings 112 can include a top side 114, a bottom side 116, a front edge 113, and a rear edge 115 configured to support and secure the mouthpiece 102 in the mouth of a patient. A comfort retention cutout/notch 118 can form a space between the internal retentive wings 106 and the external retentive wings 112 to enhance comfort and fit of the mouthpiece 102 when inserted into the mouth of a patient. In some embodiments, the wings 106, 112 can be formed from a semi-rigid flexible (e.g., malleable) material such that the internal wings 106 can be shaped to securely and comfortably fit around the teeth of a patient and/or the external wings 112 can be shaped to securely and comfortably support the mouthpiece 102 on the lip of a patient (described in further detail with reference to FIGS. 3A-5), in accordance with aspects of the present invention.

In accordance with aspects of the present invention, the mouthpiece 102 can include a mouthpiece suction opening 120 which can include a mouthpiece opening bottom edge 122 and a mouthpiece opening top edge 124. In some embodiments, the mouthpiece opening top edge 124 can include an upper frenum comfort cutout 128 at or near a midpoint of the mouthpiece opening top edge 124. An internal frenum comfort cutout 126 can be formed at or near a midpoint between opposing internal retentive wings 106, and can extend upward from a bottom edge 109 of the internal retentive wings 106 such that the frenum (e.g., upper, or lower labial frenum) of a patient can be positioned within the comfort cutout 126 when the mouthpiece 102 is inserted into the mouth of a patient, in accordance with aspects of the present invention. The HVE line/valve stem 104 of the lip retractor and aerosol suction device head 202 can include external sidewalls 130, internal sidewalls 132, and an HVE line/valve stem connecting end portion 134 configured for insertion 213 into an opening 215 in a valve handpiece 221 (e.g., HVE valve handpiece) for receiving an HVE line/valve stem 104, in accordance with embodiments of the present invention.

In accordance with aspects of the present invention, an HVE line/valve stem connecting end portion 134 can be inserted into a valve handpiece 221, which can include a connection opening 215, interior sidewalls 217, and exterior sidewalls 219. The HVE line/valve stem 104 can be inserted into the opening 215 of the valve handpiece 221 such that the external sidewalls 130 of the HVE line/valve stem 104 are in contact with the internal sidewalls 217 of the valve handpiece 221 and secured together by, for example, an interference fit (e.g., similarly to a conventional suction tip), in accordance with aspects of the present invention.

The components of the lip retractor and aerosol suction device head and HVE line/valve stem 202 can be fabricated from any material suitable for dental/health-care devices, including, for example, paper, cardboard, plastics, metals, polymers, ceramics, semi-rigid materials, rigid materials, rubbers, silicone, Styrofoam, etc., as readily understood by one of ordinary skill in the art. In accordance with various embodiments of the present invention, some or all components of the integrated lip retractor and aerosol suction device head mouthpiece 102 and attachable HVE line/valve stem 104 can be configured to be disposable (e.g., paper, cardboard, Styrofoam, high-density polyethylene, etc.), or configured to be sterilized and non-disposable (e.g., plastic, metal, rubber, etc.). Of course, in accordance with various embodiments, the integrated lip retractor and suction head and attachable HVE line/valve stem 202 may also include other elements (not shown), and may be formed from any suitable materials, as readily contemplated by one of skill in the art, as well as omit certain elements.

Figure 2B:
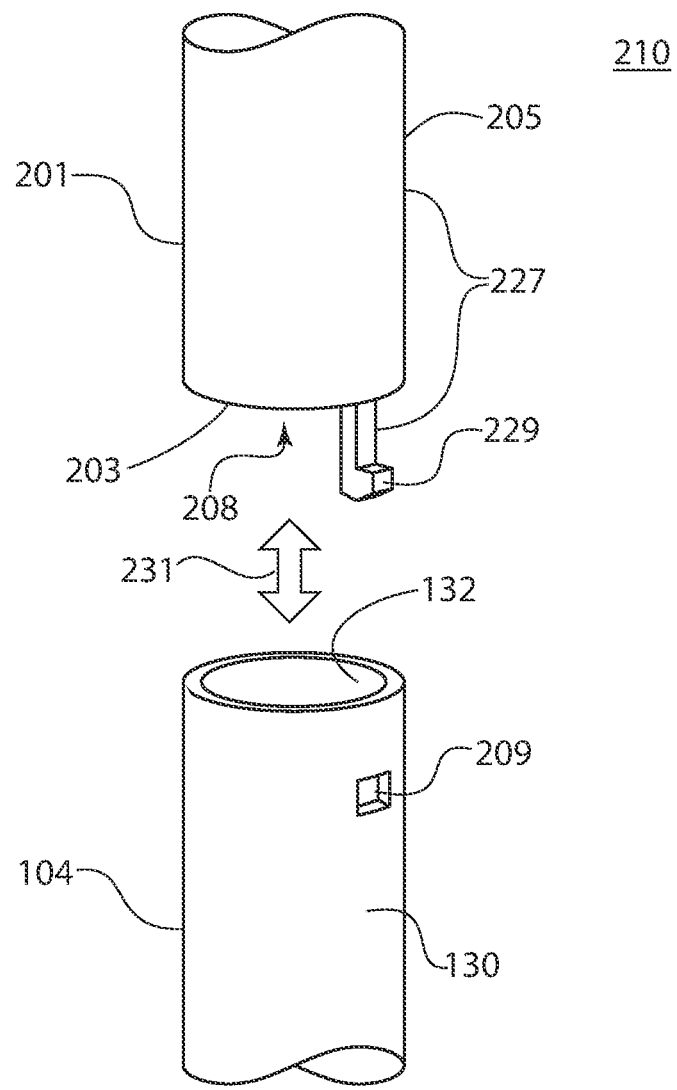
FIG. 2B is a view showing connecting portions of the extraoral, aerosol suction device head with a separable lip retractor mouthpiece and HVE line/tube of FIG. 2A, in accordance with an aspect of the present invention.

Referring now to FIG. 2B, with continued reference to FIG. 2A, a view 210 showing connecting portions of an extraoral, aerosol suction device head 202 with a High-Volume Evacuator (HVE) line/valve stem 104 and a separable mouthpiece 102 configured for hands-free use when positioned in the mouth of a patient with an attachable High-Volume Evacuator (HVE) valve 221 and HVE line/tube 223, is illustratively depicted in accordance with aspects of the present invention.

In accordance with an embodiment of the present invention, the extraoral lip retractor and aerosol suction device head 103 of FIG. 2A can include a mouthpiece-to-HVE line connecting end portion 201, which can include internal sidewalls 203, external sidewalls 205, and a clip lock securing mechanism 227 to connect 231 with the HVE line/valve stem 104 by inserting the HVE line/valve stem 104 into the opening 208 in the mouthpiece-to-HVE line connecting end portion 201. The HVE line/valve stem 104 can be inserted into the mouthpiece-to-HVE line connecting end portion 201 such that the external sidewalls 130 of the HVE line/valve stem 104 are in contact with the internal sidewalls 203 of the mouthpiece-to-HVE line connecting end portion 201 and secured by, for example, a clip lock mechanism 227 and a lock receiving portion 209 (e.g., industry standard or customized lock receiving portion), in accordance with aspects of the present invention.

In some embodiments, a clip lock mechanism 227 can be disposed on an internal sidewall 203 of the mouthpiece-to-HVE line connecting end portion 201, and can extend through the opening 208 in the mouthpiece-to-HVE line connecting end portion 201 such that an end portion 229 of the clip lock mechanism 227 is of sufficient length to reach the lock receiving portion 209 and be clipped into the lock receiving portion 209 to secure the mouthpiece-to-HVE line connecting end portion 201 together with the lock receiving portion 209 during use.

In an embodiment, the locking mechanism 227, 209 can secure the mouthpiece with the HVE line/valve stem 104 by sliding the mouthpiece-to-HVE line connecting end portion 201 over the HVE line/valve stem 104 and locking together by sliding the clip lock mechanism 227 along an internal sidewall 132 of the HVE line/valve stem 104 until the clip lock mechanism 227 reaches and is securely clipped into the lock receiving portion 209 to prevent dislodging during use. The locking mechanism 227, 209 of the present invention can firmly and securely attach the mouthpiece 102 to any pre-existing, standard high-speed suction tips, extender tubes, HVE line/valve stems 104 (e.g., connection line/tube) to directly insert into a valve handpiece 221 and/or high-speed evacuation line 223. The built-in single-lip retractor mouthpiece 102 can expose the operating field (e.g., teeth) for dental work or dental photography while minimizing aerosol escaping, in accordance with aspects of the present invention.

Figure 3A:
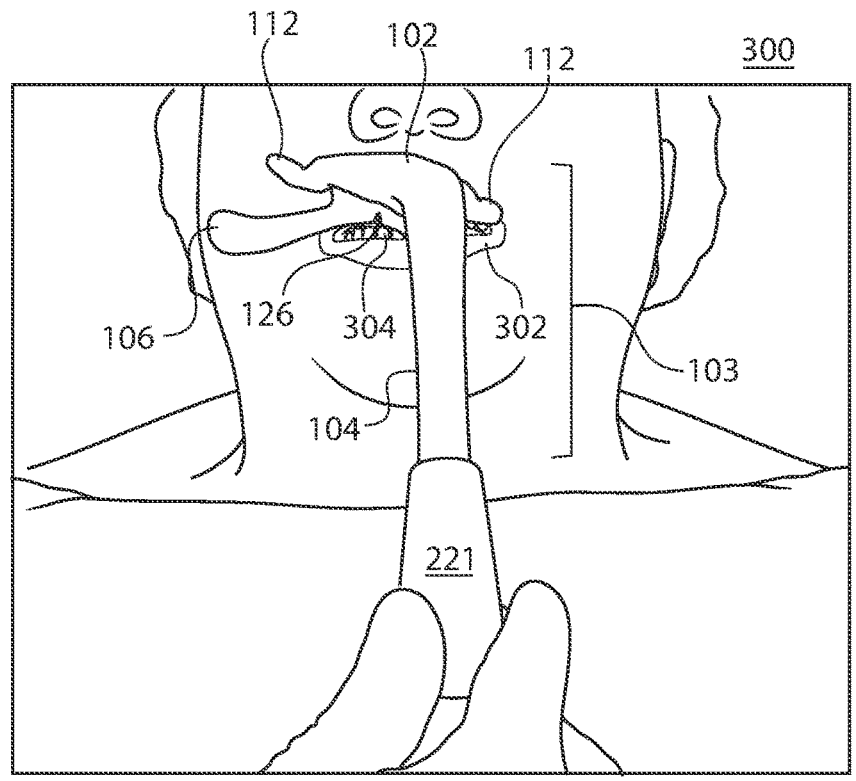
FIG. 3A is a view showing a single-piece extraoral, aerosol suction device head with an integrated lip retractor mouthpiece of the system shown in FIG. 1A being positioned in the mouth of a patient, in accordance with an aspect of the present invention.

Referring now to FIG. 3A, with continued reference to FIG. 1A, a view 300 showing a single-piece extraoral, aerosol suction device head 103 with an integrated mouthpiece 102 of the system shown in FIG. 1A being positioned in the mouth of a patient, is illustratively depicted in accordance with an embodiment of the present invention. In one embodiment, the mouthpiece 102 can be inserted into the mouth of a patient by angling the aerosol suction device head 103 during insertion such that the internal wings 106 are positioned inside the mouth between the lower lip 302 and the lower teeth 304 of the patient. An internal frenum comfort cutout 126 can be positioned around the labial frenum of the patient to enhance comfort during use. The external wings 112 can be positioned such that the external wings 112 are seated on an external corner of the mouth of the patient during use. The mouthpiece 102 once inserted can be utilized as a suction device in which aerosols, etc. can be vacuumed through the HVE line/valve stem 104 and the valve handpiece 221 in accordance with embodiments of the present invention.

Figure 3B:
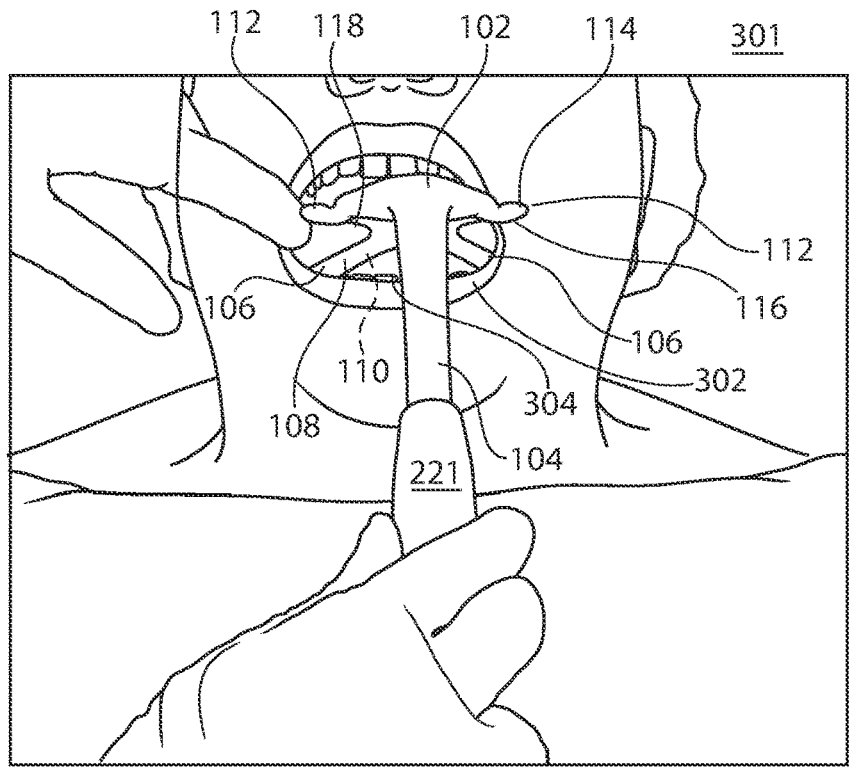
FIG. 3B is a view showing a single-piece extraoral, aerosol suction device head with an integrated lip retractor mouthpiece of the system shown in FIG. 1A being positioned in the mouth of a patient, in accordance with an aspect of the present invention.

Referring now to FIG. 3B, with continued reference to FIG. 1A, a view 301 showing a single-piece extraoral, aerosol suction device head 103 with an integrated mouthpiece 102 of the system shown in FIG. 1A being positioned in the mouth of a patient, is illustratively depicted in accordance with an embodiment of the present invention. In one embodiment, after initially inserting one side of the mouthpiece 102 into the mouth of a patient by angling the aerosol suction device head 103 during insertion, opposing side internal wings 106 can be inserted into the mouth of the patient such that both sides of the internal wings 106 are positioned inside the mouth between the lower lip 302 and the lower teeth 304 of the patient. In various embodiments, the front side 108 of the internal retentive wings 106 can be positioned facing the interior of the lower lip 302 of the patient and the rear side 110 of the internal retentive wings can be positioned facing the front side of the lower teeth 304 of the patient. An internal frenum comfort cutout 126 can be positioned around the labial frenum of the patient to enhance comfort during use.

In accordance with aspects of the present invention, the external wings 112 can be positioned such that the external wings 112 are seated on an external corner of the mouth of the patient, with the bottom side 116 being in contact with the face of the patient and the top side 114 facing away from the mouth of the patient during use. The internal wings 106 and the external wings 112 can be separated by a comfort cutout 118 configured to enhance comfort by providing a space to prevent requiring excessive opening of the mouth, enabling a full range of motion of the mouth and lips of the patient, and/or irritation from portions of the mouthpiece 102 during use. The comfort cutout 118 enables the lip of the patient to move dynamically with a full range of motion and without dislodging the mouthpiece 102 during use. The mouthpiece 102 once inserted can be utilized as a suction device in which aerosols, particulates, etc. can be vacuumed through the HVE line/valve stem 104 and the valve handpiece 221 in accordance with embodiments of the present invention.

Figure 3C:
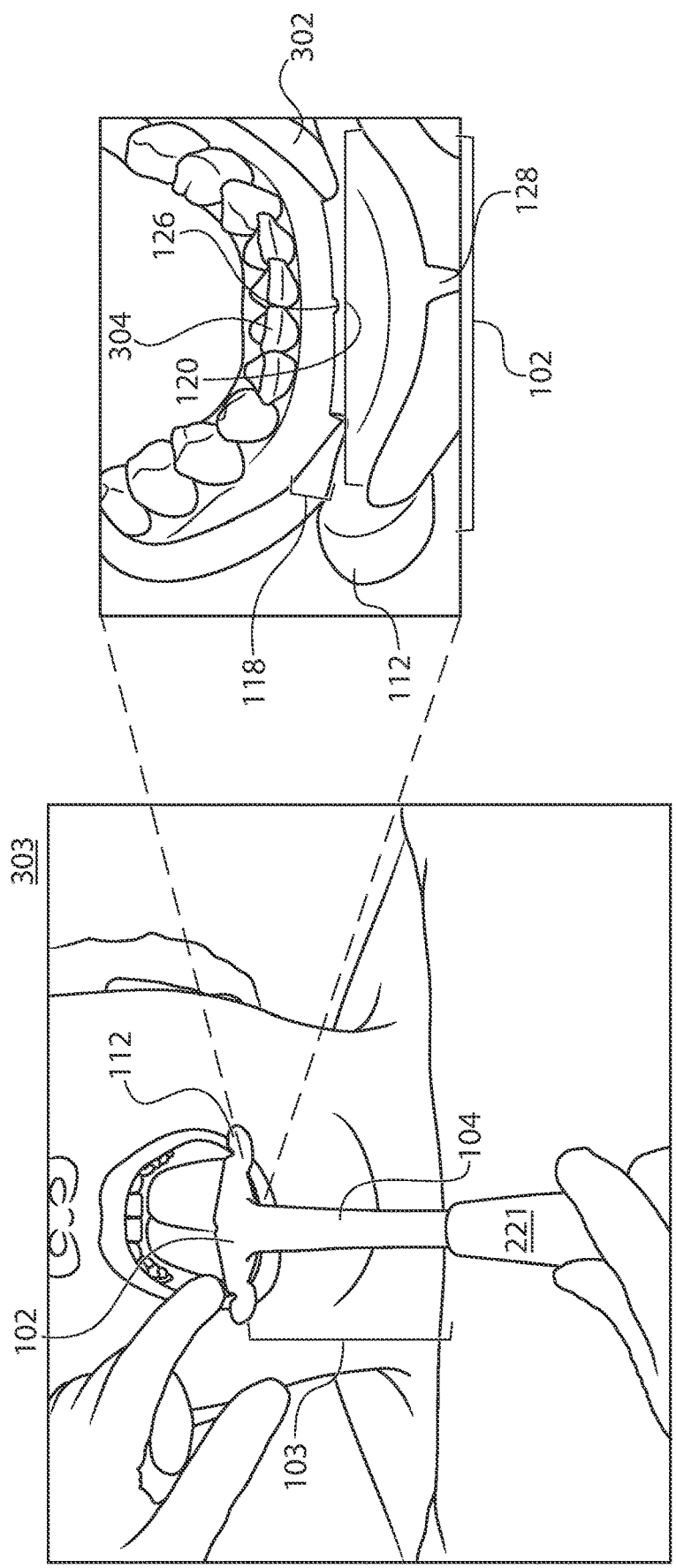
FIG. 3C is a view showing a single-piece extraoral, aerosol suction device head with an integrated lip retractor mouthpiece of the system shown in FIG. 1A positioned in the mouth of a patient, in accordance with an aspect of the present invention.

Referring now to FIG. 3C, with continued reference to FIG. 1A, a view 303 showing a single-piece extraoral, aerosol suction device head 103 with an integrated mouthpiece 102 of the system shown in FIG. 1A positioned in the mouth of a patient, is illustratively depicted in accordance with an embodiment of the present invention.

In one embodiment, after initially inserting opposing side internal wings 106 into the mouth of the patient such that both sides of the internal wings 106 are positioned inside the mouth between the lower lip 302 and the lower teeth 304 of the patient, suction can be turned on using the valve handpiece 221. In various embodiments, the front side 108 of the internal retentive wings 106 can be positioned facing the interior of the lower lip 302 of the patient and the rear side 110 of the internal retentive wings can be positioned facing the front side of the lower teeth 304 of the patient. An internal frenum comfort cutout 126 can be positioned around the labial frenum of the patient to enhance comfort and to prevent damage to the labial frenum of the patient during use.

In accordance with aspects of the present invention, the external wings 112 can be positioned such that the external wings 112 are seated on an external corner of the mouth of the patient, with the bottom side 116 being in contact with the face of the patient and the top side 114 facing away from the mouth of the patient during use. The internal wings 106 and the external wings 112 can be separated by a comfort cutout 118 configured to enhance comfort by providing a space to prevent excessive opening of the mouth and/or irritation from sides of the mouthpiece 102 during use. In some embodiments, the mouthpiece can include a safety comfort cutout/vent 128 to prevent damage and/or discomfort of the labial frenum of the patient during use. The mouthpiece 102 once inserted can be utilized as a suction device in which aerosols, particulates, etc. can be vacuumed through the HVE line/valve stem 104 and the valve handpiece 221 in accordance with embodiments of the present invention.

Figure 3D:
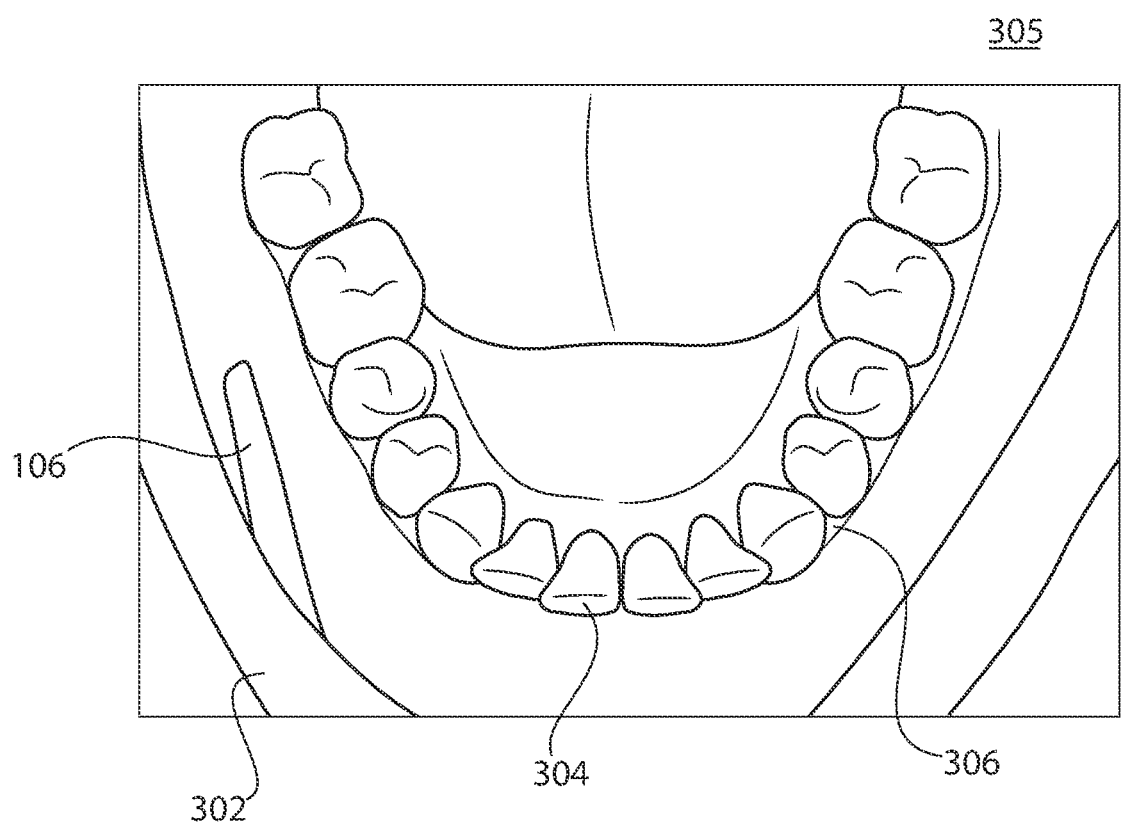
FIG. 3D is a view showing a single-piece extraoral, aerosol suction device head with an integrated lip retractor mouthpiece of the system shown in FIG. 1A positioned in the mouth of a patient, in accordance with an aspect of the present invention.

Referring now to FIG. 3D, with continued reference to FIG. 1A, a view 305 showing a single-piece extraoral, aerosol suction device head 103 with an integrated mouthpiece 102 of the system shown in FIG. 1A positioned in the mouth of a patient, is illustratively depicted in accordance with an embodiment of the present invention.

In accordance with embodiments of the present invention, internal retentive wings 106 can be positioned on an interior surface of a bottom (or top) lip 302 between the bottom lip 302 and the bottom teeth 304 and gums 306 of the patient to comfortably open the mouth of the patient for dental procedures (e.g., photography, cleaning, dental surgery, etc.). The internal retentive wings 106 can be malleable and flexible, and can include a thicker portion closest to an internal frenum cutout 126 which can gradually (or immediately) become thinner toward an end portion of the internal retentive wings 106. The malleability, flexibility, shape, and portions of different thickness of the internal retentive wings 106 enable the internal retentive wings 106 to maintain a shape (e.g., the shape of the mouth of a patient after inserting into the mouth during use) such that the mouthpiece 102 can be removed from the mouth of the patient and re-inserted without requiring any additional bending of the internal retentive wings 106 to fit the mouth of the patient because the internal retentive wings 106 can maintain the previous shape in accordance with aspects of the present invention.

In various embodiments of the present invention (e.g., dental photography, accessing difficult to reach teeth, etc.), the internal retentive wings 106 can be shaped by the user to expose particular areas of the mouth of a patient during dental procedures at least in part because the internal retentive wings 106 are malleable and flexible throughout, and can be shaped by the user in any of a plurality of positions to expose any portion of the mouth of a patient. Conventionally, a dental professional can only view such areas of the mouth of a patient by holding a dental minor inside the mouth of the patient, requiring the dental professional to hold the minor and thus, only have use of one hand during a dental procedure. The mouthpiece 102 can be supported and secured to the mouth of the patient using the internal retentive wings 106 and the external wings 112 in a hands-free manner such that the user (e.g., dental professional) can freely utilize both hands during dental procedures, in accordance with aspects of the present invention.

Figure 4:
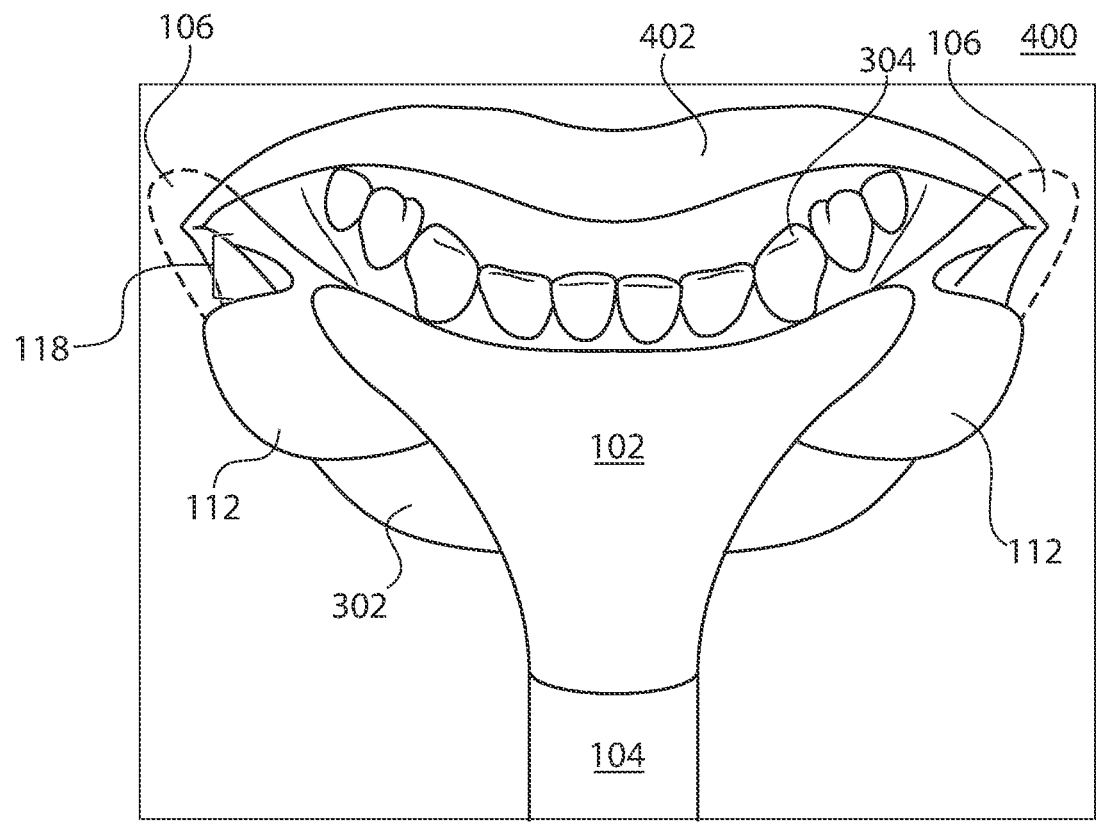
FIG. 4 is a view showing a single-piece extraoral, aerosol suction device head with an integrated lip retractor mouthpiece of the system shown in FIG. 1A positioned in the mouth of a patient and exposing the lower teeth of the patient, in accordance with an aspect of the present invention.

Referring now to FIG. 4, with continued reference to FIG. 1A, a view 400 showing a single-piece extraoral, aerosol suction device head 103 with an integrated mouthpiece 102 of the system shown in FIG. 1A positioned in the mouth and exposing the lower teeth 304 of a patient, is illustratively depicted in accordance with an embodiment of the present invention.

In one embodiment, after initially inserting opposing side internal wings 106 into the mouth of the patient such that both sides of the internal wings 106 are positioned inside the mouth between the lower lip 302 and the lower teeth 304 of the patient, suction can be turned on using the valve handpiece 221. In various embodiments, the front side 108 of the internal retentive wings 106 can be positioned facing the interior of the lower lip 302 of the patient and the rear side 110 of the internal retentive wings can be positioned facing the front side of the lower teeth 304 of the patient. An internal frenum comfort cutout 126 can be positioned, for example, around the labial frenum of the patient to enhance comfort and to prevent damage to the labial frenum of the patient during use.

In accordance with aspects of the present invention, the external wings 112 can be positioned such that the external wings 112 are seated on an external corner of the mouth of the patient, with the bottom side 116 being in contact with the face of the patient and the top side 114 facing away from the mouth of the patient during use. The internal wings 106 and the external wings 112 can be separated by a comfort cutout 118 configured to enhance comfort by providing a space to prevent excessive opening of the mouth and/or irritation from sides of the mouthpiece 102 during use. In some embodiments, the mouthpiece can include a safety comfort cutout/vent 128 to prevent damage and/or discomfort of the labial frenum of the patient during use. The mouthpiece 102 once inserted can be utilized as a suction device in which aerosols, particulates, etc. can be vacuumed through the HVE line/valve stem 104 and the valve handpiece 221 in accordance with embodiments of the present invention.

In accordance with aspects of the present invention, the mouthpiece 102 of the present invention can be attached to the mouth of a patient and can and retract a single lip (e.g., bottom lip 302 in this illustrative embodiment, but an upper lip 402 can also be retracted singly), in accordance with embodiments of the present invention. The single-piece extraoral, aerosol suction device head 103 with an integrated mouthpiece 102 can be utilized hands-free during dental procedures as the above-described features (e.g., retentive wings 106, 112) of the single-piece extraoral, aerosol suction device head 103 with an integrated mouthpiece 102 provide a secure fit to the lower lip 302 or upper lip 402 of the patient in accordance with embodiments of the present invention. In this illustrative embodiment, the system can include internal retentive wings 106 positioned inside the mouth between the check, gums, and lower teeth 304 such that the lower jaw is effectively and comfortably sufficiently separated from the upper jaw and thus providing sufficient opening of a patient's mouth for dental procedures to be performed without interference from the mouth or lips 302, 402 of a patient.

It is to be appreciated that various components of the single-piece extraoral, aerosol suction device head 103 with an integrated mouthpiece 102 can be formed in any of a plurality of different shapes and/or sizes in accordance with various embodiments of the present invention. For example, the internal retentive wings 106 can be longer, shorter, thinner, thicker, etc. at the end sections than the embodiment shown in FIG. 1A. In some embodiments, the comfort cutouts 126,128 configured to prevent irritation and/or damage to the frenum of a patient during use can be larger or smaller than the embodiments shown in FIG. 1A, the comfort/retention notches on opposing lateral sides of the mouthpiece 102 can provide a larger, smaller, or differently shaped cutout space, the external retentive wings 112 can be larger, smaller, or differently shaped that the embodiment shown in FIG. 1A, etc., in accordance with various embodiments of the present invention.

In some embodiments, the single-lip (e.g., internal, or external) retentive wings 106, 112 can be thicker at the base of the wing 106, 112 than at the top of the wing 106, 112, and the top edges of the wings 106, 112 can be comparatively thin and concave while the bottom edges of the wings can be comparatively thick and convex. The external wings 112 can be flat and comparatively thin in relation to the internal retentive wings 106 (or vice-versa), and can be utilized for stabilization of the mouthpiece 102 when inserted into the mouth of the patient, in accordance with embodiments of the present invention.

In accordance with aspects of the present invention, internal retentive wings 106 can provide a secure fit when the mouthpiece 102 is inserted into the mouth of a patient by an interference fit with interior portions of the mouth and/or surfaces of the teeth 302, 402 of the patient. The interference fit can become more secure during use because of the shape, positioning, and malleability of material of the internal retention wings 106. In particular, in some embodiments, as the mouth of the patient opens, the thicker part of the wings 106 can depresses and thus provide a more retentive fit than conventional systems in conjunction with the external retentive wings 112 when the mouth is opened during use of the system. In some embodiments, the external wings 112 can be substantially planar and can provide further stabilization and support for the single-piece extraoral, aerosol suction device head 103, in accordance with aspects of the present invention.

The comfort/retention notches 118 can significantly reduce discomfort for a patient during use by preventing and/or significantly reducing contact by the labial commissure of the mouth with the mouthpiece 102 during use of the system when a patient's mouth is opened (e.g., necessarily causing the corners of the patients mouth to close in), in accordance with aspects of the present invention.

Figure 5:
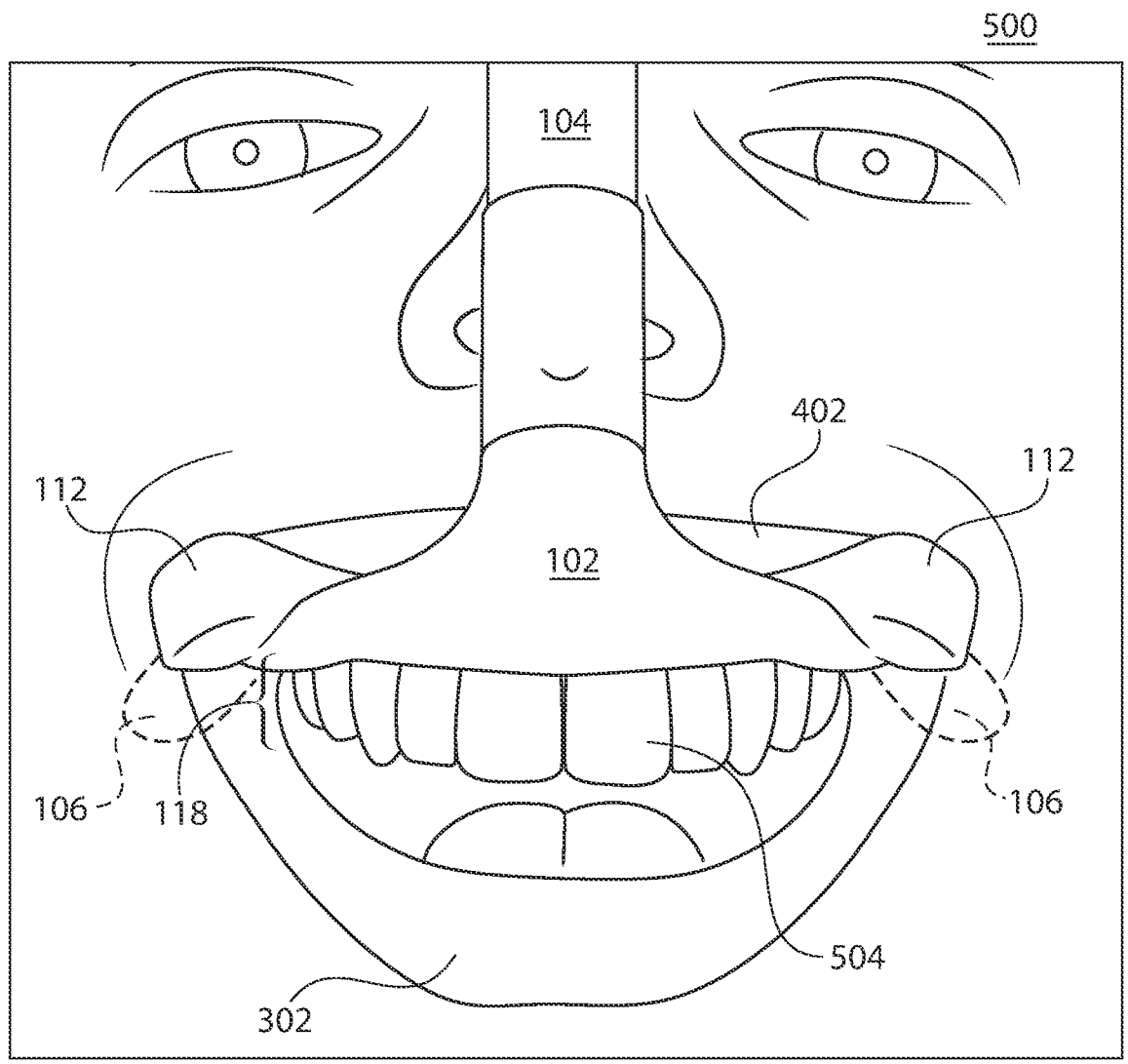
FIG. 5 is a view showing a single-piece extraoral, aerosol suction device head with an integrated lip retractor mouthpiece of the system shown in FIG. 1A positioned in the mouth of a patient and exposing the upper teeth of the patient, in accordance with an aspect of the present invention.

Referring now to FIG. 5, with continued reference to FIG. 1A, a view 500 showing a single-piece extraoral, aerosol suction device head 103 with an integrated mouthpiece 102 of the system shown in FIG. 1A positioned in the mouth and exposing the upper teeth 504 of a patient, is illustratively depicted in accordance with an embodiment of the present invention.

In one embodiment, after initially inserting opposing side internal wings 106 into the mouth of the patient such that both sides of the internal wings 106 are positioned inside the mouth between the upper lip 402 and the upper teeth 504 of the patient, suction can be turned on using the valve handpiece 221. In various embodiments, the front side 108 of the internal retentive wings 106 can be positioned facing the interior of the upper lip 402 of the patient and the rear side 110 of the internal retentive wings can be positioned facing the front side of the upper teeth 504 of the patient. An internal frenum comfort cutout 126 can be positioned around the upper labial frenum of the patient to enhance comfort and to prevent damage to the labial frenum of the patient during use.

In accordance with aspects of the present invention, the external wings 112 can be positioned such that the external wings 112 are seated on an external corner of the mouth of the patient, with the bottom side 116 being in contact with the face of the patient and the top side 114 facing away from the mouth of the patient during use. The internal wings 106 and the external wings 112 can be separated by a comfort cutout 118 configured to enhance comfort by providing a space to prevent excessive opening of the mouth and/or irritation from sides of the mouthpiece 102 during use. In some embodiments, the mouthpiece can include a safety comfort cutout/vent 128 to prevent damage and/or discomfort of the labial frenum of the patient during use. The mouthpiece 102 once inserted can be utilized as a suction device in which aerosols, particulates, etc. can be vacuumed through the HVE line/valve stem 104 and the valve handpiece 221 in accordance with embodiments of the present invention.

In accordance with aspects of the present invention, the mouthpiece 102 of the present invention can be attached to the mouth of a patient and can and retract a single lip (e.g., upper lip 402 in this illustrative embodiment, but a lower lip 302 can also be retracted singly), in accordance with embodiments of the present invention. The single-piece extraoral, aerosol suction device head 103 with an integrated mouthpiece 102 can be utilized hands-free during dental procedures as the above-described features (e.g., retentive wings 106, 112) of the single-piece extraoral, aerosol suction device head 103 with an integrated mouthpiece 102 provide a secure fit to the lower lip 302 or upper lip 402 of the patient in accordance with embodiments of the present invention.

It is to be appreciated that various components of the single-piece extraoral, aerosol suction device head 103 with an integrated mouthpiece 102 can be formed in any of a plurality of different shapes and/or sizes in accordance with various embodiments of the present invention. For example, the internal retentive wings 106 can be longer, shorter, thinner, thicker, etc. at the end sections than the embodiment shown in FIG. 1A. In some embodiments, the comfort cutouts 126,128 configured to prevent irritation and/or damage to the frenum of a patient during use can be larger or smaller than the embodiments shown in FIG. 1A, the comfort/retention notches on opposing lateral sides of the mouthpiece 102 can provide a larger, smaller, or differently shaped cutout space, the external retentive wings 112 can be larger, smaller, or differently shaped that the embodiment shown in FIG. 1A, etc., in accordance with various embodiments of the present invention.

In some embodiments, the single-lip (e.g., upper, or lower) retentive wings 106, 112 can be thicker at the base of the wing 106, 112 than at the top of the wing 106, 112, and the top edges of the wings 106, 112 can be comparatively thin and concave while the bottom edges of the wings can be comparatively thick and convex. The external wings 112 can be flat and comparatively thin in relation to the internal retentive wings 106, and can be utilized for stabilization of the mouthpiece 102 when inserted into the mouth of the patient, in accordance with embodiments of the present invention.

In some embodiments, when utilized as a single-lip retractor for the upper lip 402, the single-piece extraoral, aerosol suction device head 103 with an integrated mouthpiece 102 of the present invention can be hand-held during use to hold the lip away from the teeth and keep the teeth dry at the same time, and/or can rest on the upper lip and nose area of the patient, in accordance with aspects of the present invention.

It will be understood that various modifications may be made to the embodiments disclosed herein. Therefore, the above description should not be construed as limiting, but merely as exemplification of the various embodiments. Those skilled in the art will envision other modifications within the scope and spirit of the claims appended hereto.

Having described preferred embodiments of a system and method for a single-piece, extraoral, aerosol suction device with an integrated mouthpiece and an attachable or integrated HVE line/valve stem for connection to HVE systems (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A system for lip retraction and aerosol reduction, comprising:
 a mouthpiece comprising:
  an integrated single-lip retractor and aerosol suction head,
  single-lip internal retentive wings and external retentive wings configured to support and secure the mouthpiece in a mouth of a patient, the internal retentive wings being formed from a solid, semi-rigid flexible material and configured to expose teeth of the patient by positioning and shaping the internal retentive wings to comfortably fit between an adjacent row of the teeth of the patient, and
  comfort retention notches formed between the internal retentive wings and the external retentive wings configured to enhance comfort of the patient and to secure the mouthpiece in the mouth of the patient; and
 a High-Volume Evacuator (HVE) valve stem configured for attachment to an HVE suction tube to provide suction for the aerosol reduction.

2. The system as recited in claim 1, wherein the HVE valve stem is integrated with the mouthpiece in a single piece.

3. The system as recited ire claim 1, wherein the HVE valve stem is separable from the mouthpiece.

4. The system as recited in claim 1, wherein the HVE valve stem is configured for attachment with the mouthpiece and includes an HVE tube with a vent hole configured for securing the HVE valve stem and the mouthpiece using a wedge lock.

5. The system as recited in claim 1, wherein an internal frenum comfort cutout is formed at a midpoint in a bottom edge of the internal retentive wings.

6. The system as recited in claim 1, wherein the mouthpiece further comprises an opening to enable suction of particulates from the mouth of the patient when attached to an HVE evacuator tube.

7. The system as recited in claim 1, wherein the external retentive wings are configured to support the mouthpiece by a bottom side of the external retentive wings being positioned directly on a bottom lip of the patient.

8. The system as recited in claim 1, wherein top edges of the external retentive wings are comparatively thin and concave while bottom edges of the external retentive wings are comparatively thick and convex.

9. The system as recited in claim 1, wherein the external retentive wings are substantially planar and comparatively thinner than the internal retentive wings.

10. The system as recited in claim 1, wherein the mouthpiece and the HVE valve stein are configured for a single-use and are formed from disposable materials.

11. The system as recited in claim 1, wherein each of the internal retentive wings are comparatively larger than each of the external retentive wings, and are of sufficient length to extend from a front midpoint of a row of teeth to a farthest tooth from the front midpoint the row of teeth.

12. The system as recited in claim 1, wherein the internal retentive wings maintain a customized shape after the shaping the internal retentive wings between the gums and the adjacent row of the teeth of the patient upon removal from the mouth of the patient to increased speed of re-insertion into the mouth of the patient.

13. A system for lip retraction and aerosol reduction, comprising:
a separable lip retractor mouthpiece and High-Volume Evacuator (HVE) valve stem configured for attachment to an HVE suction tube to provide suction for the aerosol reduction, wherein:
the mouthpiece comprises:
an integrated single-lip retractor and aerosol suction head,
single-lip internal retentive wings and external retentive wings configured to support and secure the mouthpiece in a mouth of a patient, the internal retentive wings being formed from a solid, semi-rigid flexible material configured to expose teeth of the patient by positioning and shaping the internal retentive wings to comfortably fit between gums and adjacent teeth of the patient, and
comfort retention notches formed between the internal retentive wings and external retentive wings configured to enhance comfort of the patient and to secure the mouthpiece in the mouth of the patient.

14. The system as recited in claim 13, wherein the mouthpiece further comprises a connecting end portion including a locking mechanism configured for connecting and securing the separable mouthpiece and FIVE valve stem.

15. The system as recited in claim 14, wherein the locking mechanism includes wedge locking portions on the connecting end portion and the FIVE valve stem.

16. The system as recited in claim 13, wherein the HVE valve stern is configured for attachment with the mouthpiece and includes an HVE tube with a vent hole configured for securing the HVE valve stem and the mouthpiece using a wedge lock.

17. The system as recited in claim 13, wherein an internal frenum comfort cutout is formed at a midpoint in a bottom edge of the internal retentive wings.

18. The system as recited in claim 13, wherein the mouthpiece further comprises an opening to enable suction of particulates from the mouth of the patient when attached to an HVE evacuator tube.

19. The system as recited in claim 13, wherein the external retentive wings are configured to support the mouthpiece by a bottom side of the external retentive wings being in contact with corners of the mouth and a cheek, and positioned directly on a bottom lip of the patient.

20. A system for lip retraction and aerosol reduction, comprising:
a mouthpiece comprising:
an integrated single-lip retractor and aerosol suction head,
single-lip internal retentive wings and external retentive wings configured to support and secure the mouthpiece in a mouth of a patient, the internal retentive wings being formed from a solid, semi-rigid flexible material configured to expose lower teeth of the patient by being inserted into the mouth of the patient by positioning and shaping; the internal retentive wings to securely fit between lower gums and the lower teeth of the patient; and
comfort retention notches formed between the internal retentive wings and external retentive wings configured to enhance comfort of the patient and to secure the mouthpiece in the mouth of the patient; and
a High-Volume Evacuator (HVE) valve stem configured for attachment to FIVE suction tube to provide suction for the aerosol reduction.

* * * * *